United States Patent
Pillekamp (10) Patent No.: US 6,252,860 B1
(45) Date of Patent: Jun. 26, 2001

(54) METHOD AND SYSTEM FOR IMPROVING THE DEGREE UTILIZATION OF TELECOMMUNICATIONS CHANNELS IN LOCALLY CONCENTRATED, ASYNCHRONOUS WIRELESS TELECOMMUNICATIONS SYSTEMS

(75) Inventor: Klaus-Dieter Pillekamp, Erkrath (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/142,315

(22) PCT Filed: Mar. 3, 1997

(86) PCT No.: PCT/DE97/00384

§ 371 Date: Sep. 4, 1998

§ 102(e) Date: Sep. 4, 1998

(87) PCT Pub. No.: WO97/33385

PCT Pub. Date: Sep. 12, 1997

(30) Foreign Application Priority Data

Mar. 4, 1996 (DE) .............................. 196 08 183

(51) Int. Cl.⁷ ...................................... H04Q 7/00
(52) U.S. Cl. .................. 370/330; 370/337; 370/344; 370/347
(58) Field of Search ................... 370/230, 231, 370/277, 329, 330, 328, 338, 343, 344, 347, 355, 442, 443, 444, 478, 336, 337

(56) References Cited

U.S. PATENT DOCUMENTS

| 5,128,959 | * | 7/1992 | Bruckert | 370/335 |
| 5,343,513 | | 8/1994 | Kay et al. | |
| 6,094,421 | * | 7/2000 | Scott | 370/347 |
| 6,111,870 | * | 8/2000 | Kurtz | 370/344 |
| 6,112,104 | * | 8/2000 | Saario et al. | 370/335 |
| 6,134,226 | * | 10/2000 | Reed et al. | 370/328 |

FOREIGN PATENT DOCUMENTS

| 195 19 966 | 5/1995 | (DE) . |
| 195 36 587 | 9/1995 | (DE) . |
| 0 399 611 | 11/1990 | (EP) . |
| 2 249 922 | 5/1992 | (GB) . |
| WO 94/10764 | 5/1994 | (WO) . |
| WO 95/05040 | 2/1995 | (WO) . |
| WO 95/07013 | 3/1995 | (WO) . |
| WO 95/19071 | 7/1995 | (WO) . |

OTHER PUBLICATIONS

Patent Abstracts of Japan.
Time Division Multiple Access Methods for Wireless Personal Communications—by David D. Falconer, et al., pp. 50–57.
575 Nachrichtentechnik Elektronik 42(1992) Jan./Feb., No. 1, pp. 23–29.
Digitaler Komfort fur schnurlose Telekommunikation pp. 26–27.

(List continued on next page.)

Primary Examiner—Ricky Ngo
Assistant Examiner—Phuc Tran
(74) Attorney, Agent, or Firm—Bell, Boyd & Lloyd LLC (57) ABSTRACT

Method and system for improving the degree of utilization of telecommunication channels in locally concentrated asynchronous wireless telecommunication systems wherein, in each telecommunication system, for a first telecommunication connection to be set up according to a hybrid multiple access method containing the FDMA principle, including a possibly provided "dummy bearer" telecommunication connection, a free, not-yet-occupied FDMA frequency is occupied with priority, and each further telecommunication connection following the first telecommunication connection, including a handover telecommunication connection, is set up with priority on the same FDMA frequency.

16 Claims, 7 Drawing Sheets

OTHER PUBLICATIONS

Wege zur universellen mobilen Telekommunikation, pp. 35–42.

Hochoptimierte ICs fur DECT–Schnurlos–telefone, pp. 215–218.

Der GSM Standard pp. 137–152.

Spektrum pp. 47–49.

* cited by examiner

METHOD AND SYSTEM FOR IMPROVING THE DEGREE UTILIZATION OF TELECOMMUNICATIONS CHANNELS IN LOCALLY CONCENTRATED, ASYNCHRONOUS WIRELESS TELECOMMUNICATIONS SYSTEMS

FIELD OF THE INVENTION

The present invention relates to a method and system for improving the degree of utilization of telecommunication channels in locally concentrated, asynchronous, wireless telecommunication systems wherein in each telecommunication system, for a first telecommunication connection to be set up according to a hybrid multiple access method containing the FDMA principle, a free, not-yet-occupied FDMA frequency is occupied with priority and each further telecommunication connection following the first telecommunication connection is set up with priority on the same FDMA frequency.

DESCRIPTION OF THE PRIOR ART

Wireless telecommunication systems of the type designated above are message systems with a remote transmission path between a message source and a message sink for message processing and message transmission, in which
1) the message processing and message transmission can take place in a preferred direction of transmission (simplex operation) or in both directions of transmission (duplex operation);
2) the message processing is analog or digital; and
3) the message transmission over the remote transmission path is wireless (e.g., according to various standards such as DECT, GSM, WACS or PACS, IS-54, PHS, PDC, etc.) (cf. IEEE Communications Magazine, January 1995, pages 50 to 57, D. D. Falconer et al.: "Time Division Multiple Access Methods for Wireless Personal Communications").

"Message" is a higher-order term that stands both for the meaning content (information) and for the physical representation (signal). Signals can be, for example,
(1) images
(2) spoken words
(3) written words
(4) encoded words or images.

Telecommunication systems of the type sketched above are, for example, DECT systems (Digital European Cordless Telecommunication; cf. (1): Nachrichtentechnik Elektronik 42 (1992) January/February, no. 1, Berlin, Germany; U. Pilger: "Struktur des DECT-Standards," pages 23 to 29, in connection with ETS 300 175-1 . . . 9, October 1992; (2): telcom Report 16 (1993), no. 1, J. H. Koch: "Digitaler Komfort für schnurlose Telekommunikation—DECT-Standard eröffnet neue Nutzungsgebiete," pages 26 and 27; (3): tec 2/93 —Das technische Magazin von Ascom "Wege zur universellen mobilen Telekommunikation," pages 35 to 42) or GAP systems (Generic Access Profile; ETSI publication prETS300444, April 1995, Final Draft, ETSI, FR), which, for example, can be constructed according to the representation in FIG. 1.

Figure 1:
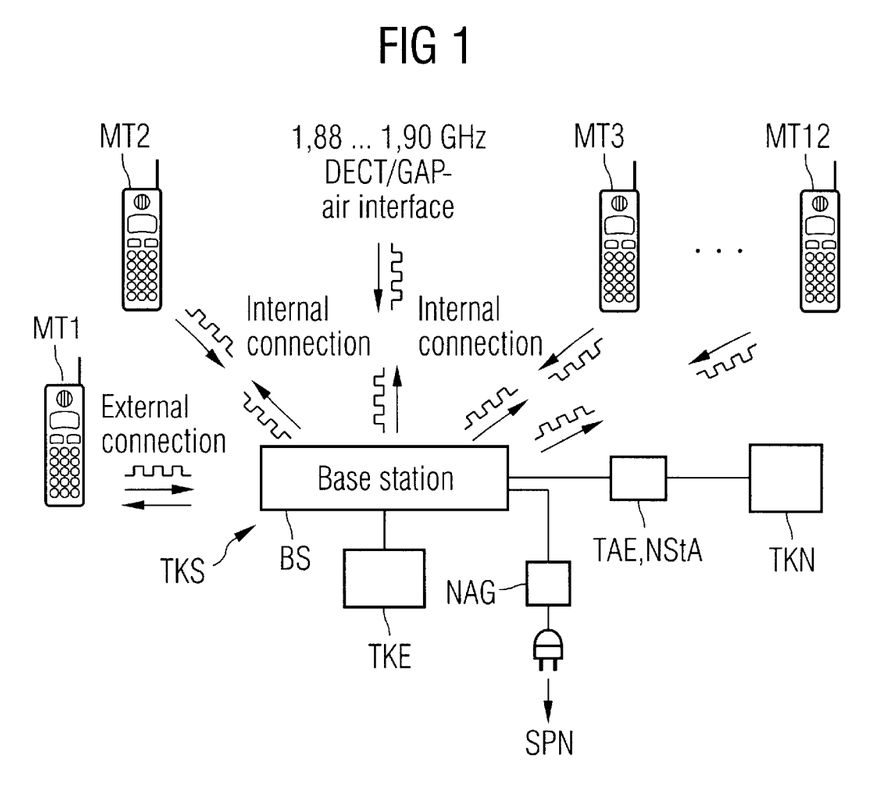
FIG. 1 shows a telecommunication system according to the DECT/GAP standard.

According to the DECT/GAP standard, as shown in FIG. 1, a maximum of 12 connections according to the TDMA/FDMA/TDD method (Time Division Multiple Access/Frequency Division Multiple Access/Time Division Duplex) can be set up to a DECT/GAP base station BS, in parallel to DECT/GAP mobile parts MT1 . . . MT12, via a DECT/GAP air interface designed for the frequency range between 1.88 and 1.90 GHz. The number 12 results from a number "k" of time slots or, respectively, telecommunication channels available for the duplex operation of a DECT/GAP system (k=12). The connection can thereby be internal and/or external. Given an internal connection, two mobile parts registered to the base station BS, e.g. the mobile part MT2 and the mobile part MT3, can communicate with one another. For the setting up of an external connection, the base station BS is connected to a telecommunication network TKN, e.g. in wire-bound fashion via a telecommunication terminal unit TAE or, respectively, a private branch exchange NStA with a line-bound telecommunication network or, according to WO 95/05040, in wireless fashion as a repeater station with a higher-order telecommunication network. Given the external connection with a mobile part, e.g. with the mobile part MT1, one can communicate with a subscriber in the telecommunication network TKN via the base station BS, the telecommunication terminal unit TAE or, respectively, private branch exchange NStA. If the base station BS has, as in the case of the Gigaset 951 (Siemens wireless telephone; cf. telcom Report 16 (1993), no. 1, pages 26 and 27), only one terminal to the telecommunication terminal unit TAE or, respectively, to the private branch exchange NStA, only one external communication can be set up. If the base station BS has, as in the case of the Gigaset 952 (Siemens wireless telephone; cf. telcom Report 16 (1993), no. 1, pages 26 and 27), two terminals to the telecommunication network TKN, then in addition to the external connection with the mobile part MT1 an additional external connection is possible from a wire-bound telecommunication terminal apparatus TKE connected to the base station BS. It is thereby also conceivable in principle that instead of the telecommunication terminal apparatus TKE, a second mobile part, e.g. the mobile part MT12, uses the second terminal for an external connection. Whereas the mobile parts MT1 . . . MT12 are operated with a battery or an accumulator, the base station BS, constructed as a wireless small switching installation, is connected to a voltage network SPN via a network terminal apparatus NAG.

Figure 2:
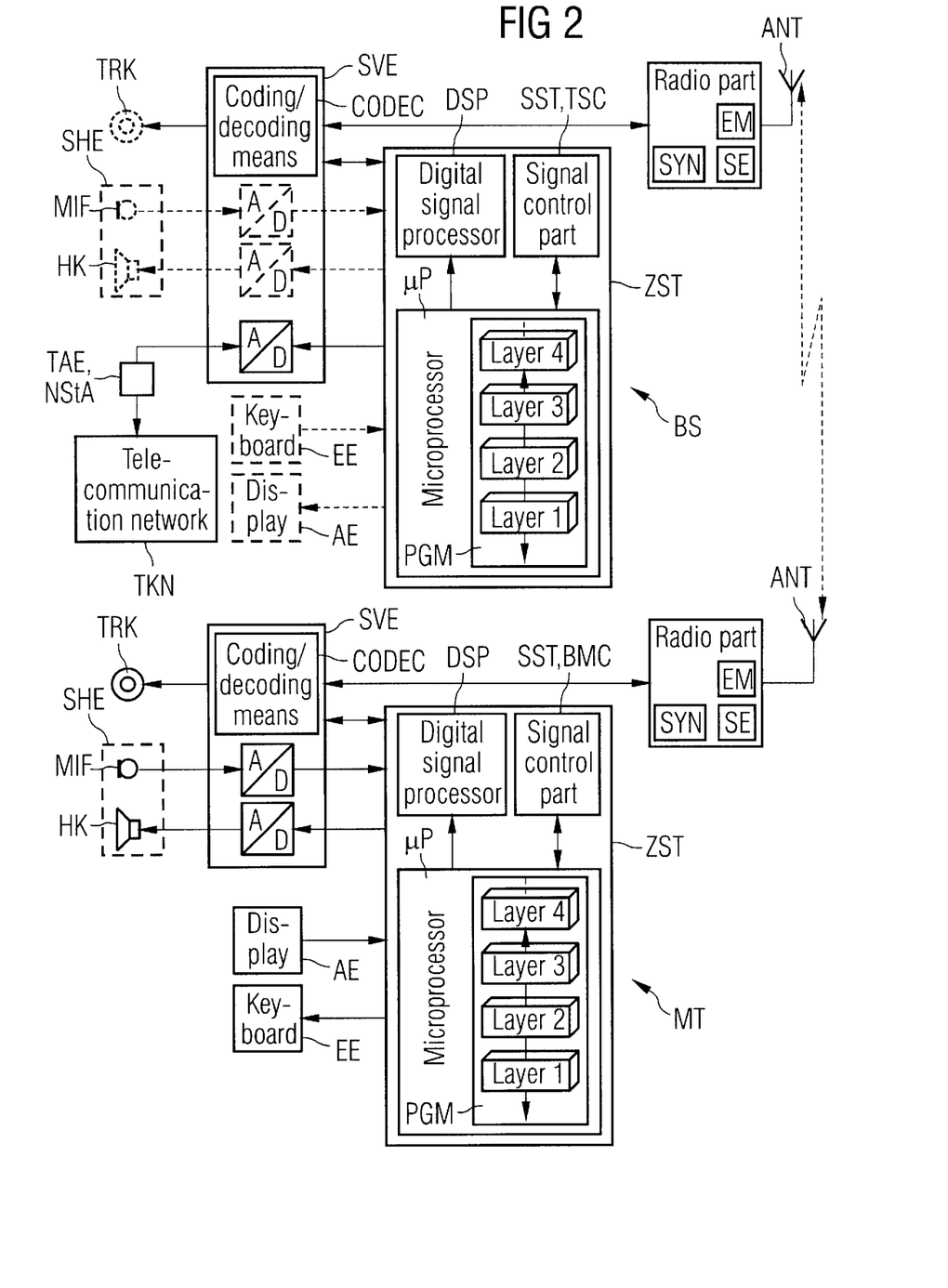
FIG. 2 shows a schematic circuit diagram of a base station and mobile part of the telecommunication system of FIG. 1.

FIG. 2 shows, on the basis of the reference Components 31 (1993), no. 6, pages 215 to 218, S. Althammer, D. Brückmann: "Hochoptimierte IC's für DECT-Schnurlostelefone," the schematic circuit construction of the base station BS and of the mobile part MT. According to FIG. 2, the base station BS and the mobile part MT includes a radio part FKT with an antenna ANT allocated for the transmission and reception of radio signals, a signal processing means SVE and a central control unit ZST, connected with one another in the way shown. In the radio part FKT, the known means, such as the transmitter SE, receiver EM and synthesizer SYN, are contained. In the signal processing means SVE, among other things a coding/decoding means CODEC is contained. The central control unit ZST includes both for the base station BS and for the mobile part MT, a microprocessor $\mu$P with a program module PGM constructed according to the OSI/ISO layer model, a signal control part SST and a digital signal processor DSP, connected to one another in the way shown. Of the layers defined in the layer model, only the first four layers, immediately essential for the base station BS and the mobile part MT, are shown. The signal control part SST is fashioned in the base station BS as a time switch controller TSC and is fashioned in the mobile part MT as a burst mode controller BMC. The essential difference between the two signal control parts TSC, BMC is that the base-station-specific signal control part TSC, in relation to the mobile-part-specific signal control part BMC, takes over additional switching functions.

The principle of operation of the circuit units described above is described for example in the reference cited above, Components 31 (1993), no. 6, pages 215 to 218.

The described circuit design according to FIG. 2 is supplemented in the base station BS and the mobile part MT by additional functional units according to their function in the DECT/GAP system according to FIG. 1.

The base station BS is connected to the telecommunication network TKN via the signal processing means SVE and the telecommunication terminal unit TAE or, respectively, the private branch exchange NStA. As an option, the base station BS can also include an operator interface (functional units drawn in with broken lines in FIG. 2), consisting, of for example, an input means EE fashioned as a keyboard, a display means AE fashioned as a display, a speech/hearing means SHE fashioned as a hand apparatus with microphone MIF and earpiece HK, and a sound call bell TRK.

The mobile part MT includes the operator interface, possible as an option in the base station BS, with the above-described operating elements belonging to this operator interface.

Figure 3:
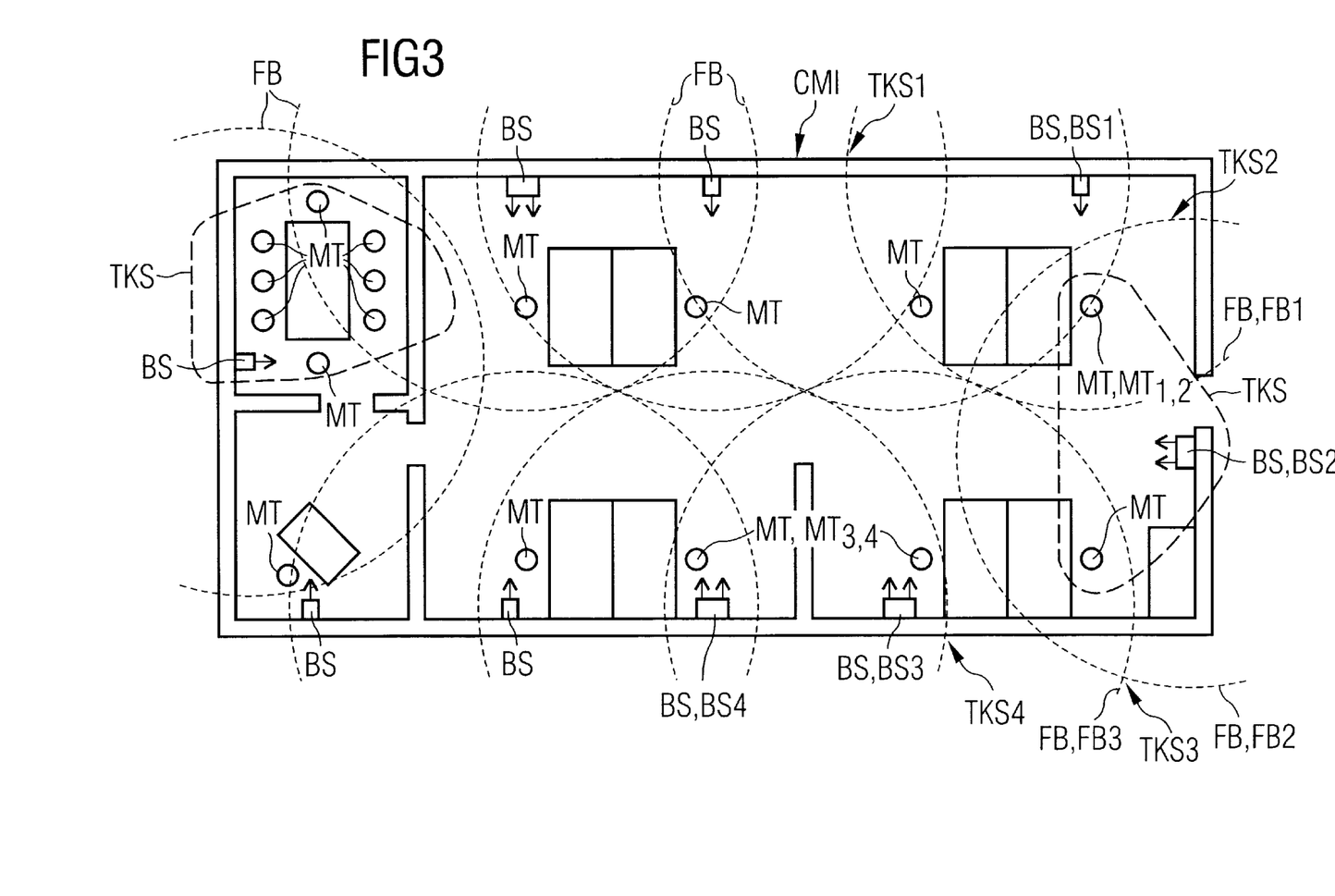
FIG. 3 shows a cellular DECT/GAP multisystem cordless multicell integration.

FIG. 3 shows a cellular DECT/GAP multisystem CMI (Cordless Multicell Integration) in which (as assumed at the beginning) several of the above-described DECT/GAP systems TKS, each with a base station BS and one/several mobile part(s) MT, are present in concentrated fashion (in the sense of a "hot spot" arrangement) at an arbitrary geographical location; e.g. in a management building with open-plan floor offices. Instead of a "closed" geographical location, such as the management building, an "open" geographical location with strategic telecommunication significance, e.g. city squares in large cities with high traffic volume, a large concentration of business units and a high degree of movement of persons, is possible for the installation of a cellular DECT/GAP multisystem CMI. In contrast to the base stations shown in FIGS. 1 and 2 according to WO94/10764, part of the base stations BS arranged in the open-plan office are constructed as antenna diversity base stations. The concentration of the DECT/GAP systems TKS is thereby so pronounced (radio coverage without gaps of the geographical location) that individual DECT/GAP systems TKS operate through the overlapping cellular DECT/GAP radio areas FB in the same environment.

According to the degree of overlapping, 'same environment' can mean that a) a first base station BS1 of a first telecommunication system TKS1 is arranged in a first radio area FB1 and a second base station BS2 of a second telecommunication system TKS2 is arranged in a second radio area FB2, wherein these base stations can set up telecommunication connections to at least one mobile part $MT_{1,2}$, and b) a third base station BS3 of a third telecommunication system TKS3 and a fourth base station BS4 of a fourth telecommunication system TKS4 are arranged in a common third radio area FB3, wherein these base stations can set up telecommunication connection connections to at least one mobile part $MT_{3,4}$.

Figure 5:
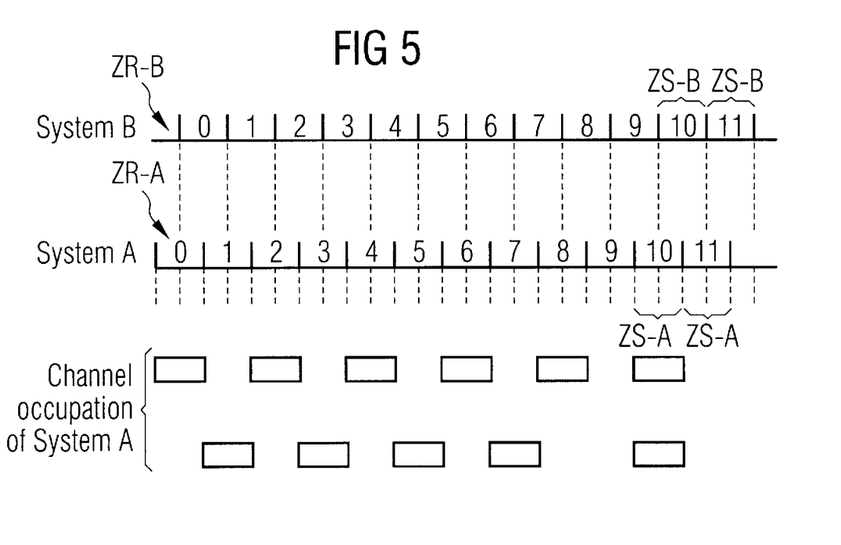
FIG. 5 shows two time frames, offset arbitrarily in relation to one another, and two time slots for the transmission direction of two DECT/GAP systems.
Figure 6:
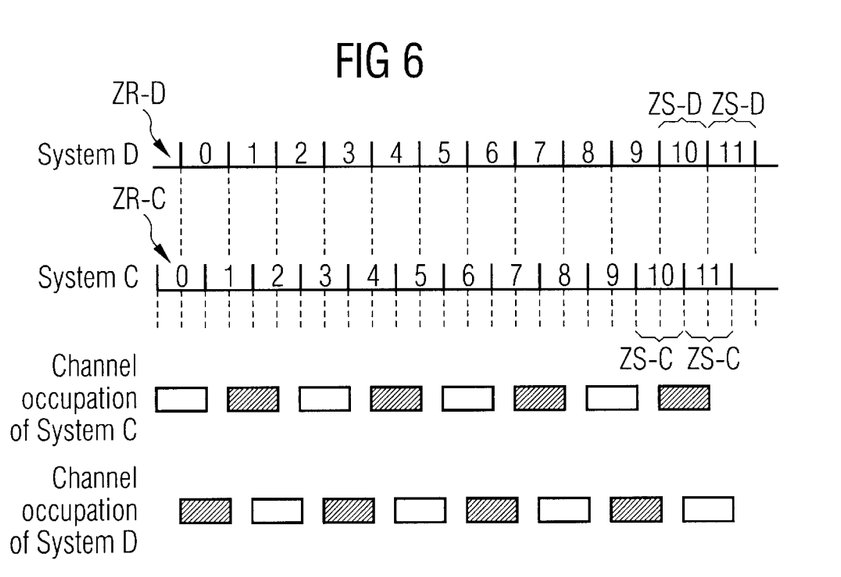
FIG. 6 shows the system of FIG. 5 with radio traffic volume distributed uniformly to the two systems.

If the DECT/GAP systems TKS in the open-plan office are asynchronous (as assumed above), i.e., the base stations BS are not synchronized, the time bases of these telecommunication systems TKS diverge from one another within a short time. FIGS. 5 and 6 explain the effect this can finally have on the channels available in the system, and thus on the frequency efficiency of the system.

Figure 4:
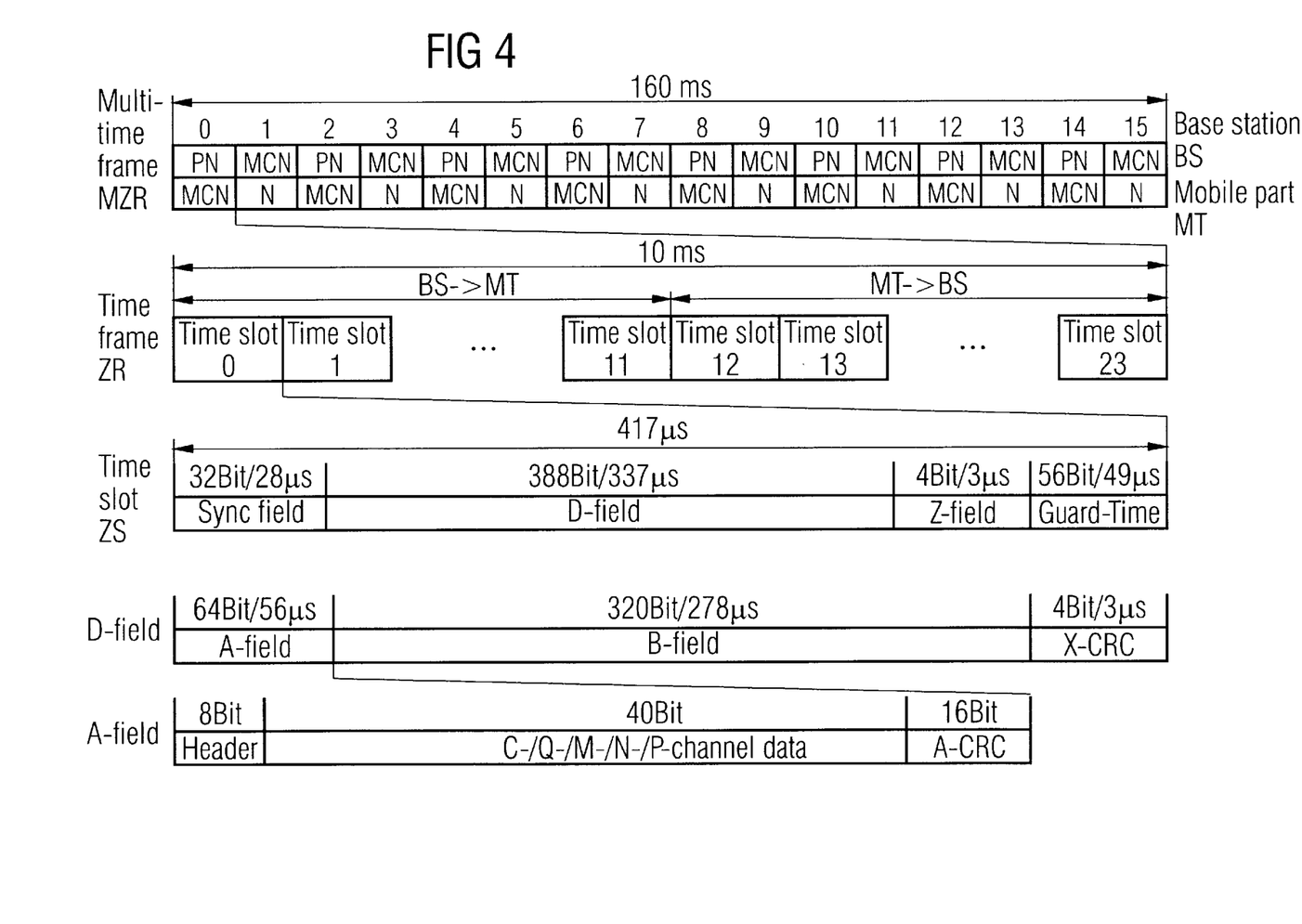
FIG. 4 shows the TDMA structure of the DECT/GAP system TKS.

Drawing on the reference "Nachrichtentechnik Elektronik 42 (1992), January/February, no. 1, Berlin, Germany, U. Pilger: "Struktur des DECT-Standards," pages 23 to 29, in connection with ETS 300 175-1 . . . 9, October 1992," FIG. 4 shows the TDMA structure of the DECT/GAP system TKS. The DECT/GAP system is a hybrid system in relation to the multiple access method in which, according to the FDMA principle, on ten frequencies in the frequency band between 1.88 and 1.9 GHz, according to FIG. 4, radio messages can be sent according to the TDMA principle in a predetermined chronological sequence from the base station BS to the mobile part MT and from the mobile part MT to the base station BS (duplex operation). The chronological sequence is thereby determined by a multi-time frame MZR that occurs every 160 ms and includes 16 time frames ZR, each with a time duration of 10 ms. In these time frames ZR, items of information are sent separately to the base station BS and to the mobile part MT, which information relates to a C-, M-, N-, P-, Q-channel defined in the DECT standard. If items of information for several of these channels are transmitted in a time frame ZR, the transmission takes place according to a priority list with M>C>N and P>N. Each of the 16 time frames ZR of the multi-time frame MZR is, in turn, divided into 24 time slots ZS, each with a time duration of 417 µs, of which 12 time slots ZS (time slots 0 . . . 11) are intended for the transmission direction "base station BS→mobile part MT" and an additional 12 time slots ZS (time slots 12 . . . 23) are determined for the transmission direction "mobile part MT→base station BS." In each of these time slots ZS, items of information are transmitted with a bit length of 480 bits according to DECT standard. Of these 480 bits, 32 bits are transmitted as synchronization information in a SYNC fields and 388 bits are transmitted as useful information in a D field. The remaining 60 bits are transmitted as additional items of information in a Z field, and as protective information in a field "Guard-Time." The 388 bits of the D-field transmitted as useful information are divided in turn into a 64-bit-long A-field, a 320-bit-long B-field, and a 4-bit-long "X-CRC" word. The 64-bit-long A-field is composed of an 8-bit-long data head (header), a 40-bit-long data set with data for the C-, Q-, M-, N-, P-channels, and a 16-bit-long "A-CRC" word.

Drawing on FIGS. 3 and 4, FIG. 5 shows two time frames ZR-A, ZR-B, offset arbitrarily in relation to one another, and time slots ZS-A, ZS-B, for the transmission direction "base station BS→mobile part MT" of two DECT/GAP systems "A," "B," which operate in the same environment of a cellular DECT/GAP multisystem. The time frames ZR-A, ZR-B and time slots ZS-A, ZS-B of the two systems "A," "B," are offset in relation to one another in such a way that a time slot occupied by the system "A" blocks two positions for potential time slots ZS-B of the system "B." In the worst case, this can have the result that (if the system "A" has already occupied 50% of its channels, i.e., six time slots of the 12 total available time slots, e.g. according to the representation in the upper right corner of FIG. 5, before the system "B" attempts to occupy its first channel) the system "B" can no longer find a free channel (time slot). However, this case is not realistic in practice because this would mean that the system "B" has practically no radio traffic volume if system "A" has already occupied 50% of its channels before the first channel occupation in the system "B."

Borrowing from FIGS. 3 and 4, FIG. 6 shows a situation substantially closer to practice. As in FIG. 5, two DECT/GAP systems "C," "D" are again arranged in a cellular DECT/GAP multisystem in such a way that the two systems "C," "D" operate in the same environment, and that, due to the lacking synchronization of the base stations in these systems, time frames ZR-C, ZR-D and time slots ZS-C, ZS-D diverge from one another. In contrast to the situation in FIG. 5, the case is now assumed in which the radio traffic volume is distributed uniformly to the two systems "C," "D," and the occupation of the channels (in contrast to the situation in FIG. 5) takes place in alternating fashion by means of the two systems. If the channel occupation (time slot occupation) takes place by means of the two systems "C," "D" according to the representation of the dark rectangle in FIG. 6, there results a total number of eight channels (time slots) that can be occupied by the two systems. The yield of occupied channels is thereby smaller by a third in relation to synchronized DECT/GAP systems "C," "D." This channel yield, smaller in relation to comparable synchronized systems, is one reason for the demand that given a local concentration of wireless telecommunication systems, e.g. DECT/GAP systems according to FIGS. 1 and 2, the base stations of these systems must be synchronized.

The demand for synchronized base stations within a cellular DECT/GAP multisystem according to FIG. 3 is, in addition, due to the fact that for the operation of the cellular DECT/GAP multisystem (in the sense of a mobile telecommunication), in analogy to the cellular mobile funk system (e.g. according to the GSM standard (Groupe Spéciale Mobile, or Global System for Mobile Communication; cf. Informatik Spektrum 14 (1991), June, no. 3, Berlin, Germany; A. Mann: "Der GSM-Standard—Grundlage für digitale europäische Mobilfunknetze", pages 137 to 152)), the realization of system-specific performance features, such as roaming (traveling through the cellular multi-radio area with a mobile part), and handover (forwarding of a duplex radio connection "base station" ↔ "mobile part" inside a radio area/a cell (intra-cell handover) and in the region of intersection (overlap region) of two radio areas/radio cells (inter-cell handover), is presupposed. For this, a corresponding coordination of the functional sequences running in the DECT/GAP system according to FIGS. 1 and 2 is required. In order to be able to do without a coordination from outside, i.e. from the line-bound public telephone network, according to the DECT standard the Dynamic Channel Allocation method (DCA method) is provided. If, for example, a DECT connection is set up, the frequency and the time window with the lowest interference are sought. The level (strength) of the interference depends primarily on whether (a) a call is already being conducted at another base station, or (b) due to movement, a mobile part is coming into visual contact with a previously occluded base station.

An increase in interference resulting from this can be countered with the TDMA transmission method (Time Division Multiple Access), which forms the basis of the DECT/GAP system. According to the TDMA method, only one time slot is used for the actual transmission, the remaining eleven time slots being used for measurements. By this means, an alternative frequency/time slot pair can be determined to which the connection can be switched over. This takes place in the context of an adaptive channel allocation according to the DECT standard (cf. Nachrichtentechnik Elektronik 42 (1992), January/February, no. 1, Berlin; U. Pilger: "Struktur des DECT-Standards", page 28, sec. 3.2.6) by means of a connection handover (intra-cell handover).

In order to handle the inter-cell handover problem that occurs regularly, in particular in cellular DECT systems, alongside the intra-cell handover, the mobile part provided for such cellular DECT/GAP systems must be able to change the base station at any time during an active telecommunication connection to a base station. Such must also be caused by a change of radio area/change of cell within the multi-radio area (setup of a telecommunication connection to another base station if the mobile part is located in an area of intersection of two radio areas/radio cells), and wherein the mobile pair forwards the already-existing active telecommunication connection without interruption (seamlessly) to the base station (seamless handover).

For this, according to the reference Nachrichtentechnik Elektronik 42 (1992), January/February, no. 1, Berlin; U. Pilger: "Struktur des DECT-Standards", page 28, ch. 3.2.6, the DECT standard provides that when the transmission quality of the existing telecommunication connection worsens the mobile part independently sets up a second telecommunication connection parallel to the existing connection, on the basis of indicators that indicate the transmission quality (e.g., signal field strength, CRC values, etc.). In this inter-cell handover procedure, the fact that in the context of the dynamic, decentralized channel allocation (DCA method) the mobile part is constantly kept informed about the status of the channels available in the current environment is exploited in such a way that the second connection is set up on the basis of the entry in a channel list.

A seamless handover is possible with the above procedure only when the mobile part is located in a DECT/GAP multisystem with synchronized base stations. In such a synchronous cellular system, the mobile part can then set up, in addition to the already-existing telecommunication connection to a base station (original base station), at least one additional connection to another base station without losing synchrony with the original base station.

Such a synchronous cellular DECT/GAP multisystem can be realized by an additional wire connection between the base stations, according to the reference ntz vol. 48 (1995), no. 1, pages 47–49, "DECT-Technik für den europäischen Markt " (cf. the above-named reference, page 48, last paragraph, to page 49, first paragraph, and FIG. 2).

In addition, according to the subsequently published German patent application P 195 36 587.9 it is possible to synchronize a cellular DECT/GAP multisystem with the aid of time character information received via radio, e.g. the DCF77 signal (cf. patent claim 1 in connection with the specification of FIG. 3).

Moreover, according to the subsequently published German patent application P 195 19 966.9, it is possible to synchronize a cellular DECT/GAP multisystem that is connected via an $S_0$ bus to a switching system (e.g., PABX, DOVst) with the aid of the $S_0$ bus (cf. patent claim 1 in connection with FIGS. 2 and 3). In addition, this method can be combined with the above-named time character information method cf. patent claim 2 in connection with the specification of FIG. 3 in the subsequently published German patent application P 195 36 587.9).

In all the above-named methods for synchronizing a cellular DECT/GAP multisystem, either an additional outlay is required in the radio part of the base stations in the DECT/GAP systems for the reception of the time character information, or an additional system outlay is required in the synchronization via the $S_0$ bus.

SUMMARY OF THE INVENTION

The underlying object of the present invention is to avoid the synchronization outlay, required in the (above-presented) prior art, for locally concentrated asynchronous wireless telecommunication systems. The underlying idea of the invention is that the wireless asynchronous telecommunication systems of the type sketched or, respectively, indicated in the introduction to the specification, concentrated at a geographical location (e.g., a "closed" or "open" location), and operating in the same environment, 1) occupy, with priority, a free, not-yet-occupied FDMA frequency for a first telecommunication connection to be set up in the respective telecommunication system according to a hybrid multiple access method containing the FDMA principle, including a "dummy bearer" telecommunication connection that is provided if warranted (as in the DECT standard (cf. ETS 300 175-3, October 1992, ch. 5.5 and 5.7))

2) are set up, with priority, on the same FDMA frequency for all further telecommunication connections, including handover telecommunication connections, subsequently ensuing in the respective telecommunication system of the first telecommunication connection.

If all telecommunication systems follow this algorithm/method, an FDMA frequency is respectively occupied by only one telecommunication system (optimal channel utilization and greatest possible frequency efficiency), whereby at the same time a synchronization takes place in relation to this frequency.

In general, the present invention relates to all locally concentrated asynchronous wireless telecommunication systems as already described in the Background section above, in which wireless telecommunication connections are set up by means of the wireless transmission of telecommunication signals according to a multiple access method containing the FDMA principle. These named telecommunication systems thus also include, for example, the systems often designated third system generation in the context of a universal mobile telecommunication, probably based on the FDMA, TDMA and CDMA principles.

Therefore, in an embodiment of the present invention, a method is provided for improving the degree of utilization of telecommunication channels in locally concentrated, asynchronous, wireless telecommunication systems, in particular DECT/GAP telecommunication systems, wherein the method includes the steps of: determining a predetermined reference level of telecommunication signals; determining levels of telecommunication signals on frequencies of the telecommunication signals predetermined by the FDMA principle and for predetermined time frames until first levels on first frequencies of the telecommunication signals for the first time frames until the predetermined reference level is reached; setting up the first telecommunication connections, according to a hybrid multiple access method containing the FDMA principle, with priority on the first frequencies of the telecommunication signals in the first time frames; storing in first telecommunication apparatuses the first frequencies and items of information concerning the first telecommunication connection set up in the first time frame; and setting up, with priority, on the stored first frequencies second telecommunication connections, according to the hybrid multiple access method containing the FDMA principles, between the first telecommunication apparatuses and second telecommunication apparatuses following the first telecommunication connections, taking into account the items of information in the first time frames.

In an embodiment, the method further includes the steps of: using the TDMA/FDMA method as the hybrid multiple access method containing the FDMA principle; dividing the time frames into time segments by the TDMA principle; setting up the first telecommunication connections, with priority, on the first frequencies of the telecommunication signals in first time segments of the first time frames; and setting up the second telecommunication connections, with priority, on the stored first frequencies and in second time slots of the first time frames.

In an embodiment, the first telecommunication connections are set up on the frequencies of the telecommunication signals and in the time frames if no first frequencies of the telecommunication signals are determined.

In an embodiment, the telecommunication systems are locally concentrated to form a "hot spot."

In an embodiment, the telecommunication signals contain items of "dummy bearer" information.

In an embodiment, the telecommunication signals contain items of "handover" control information.

In an embodiment, the telecommunication systems are DECT/GAP telecommunication systems with DECT/GAP base stations as first telecommunication apparatuses and DECT/GAP mobile parts as second telecommunication apparatuses.

In an embodiment, the telecommunication systems are GSM telecommunication systems with GSM base stations as first telecommunication apparatuses and GSM mobile parts as second telecommunication apparatuses.

In another embodiment of the present invention, a system is provided for improving the degree of utilization of telecommunication channels in locally concentrated asynchronous wireless telecommunication systems, in particular DECT/GAP telecommunication systems, which includes: the telecommunication system having first telecommunication apparatuses that can be connected with second telecommunication apparatuses of the telecommunication system using wireless telecommunication according to a hybrid multiple access method containing the FDMA principle; the first telecommunication apparatuses having a transceiver for telecommunication signals, air interfaces and central control apparatuses that are arranged and connected with one another such that, via the wireless transmission of the telecommunication signals according to the hybrid multiple access method containing the FDMA principle, wireless telecommunication connections are set up to the second telecommunication apparatuses; the transceiver having measurement means for measuring levels of the telecommunication signals on frequencies of the telecommunication signals, prior to setting up the first telecommunication connections, such that the frequencies are determined by means of the FDMA principle and for predetermined time frames; the central control apparatuses having comparison means for comparing the measured level with a predetermined reference level, and further having control means via which, depending on the comparison results, the measurement means for measuring the levels are controlled until first levels on first frequencies of the telecommunication signals and determined for first time frames do not exceed the predetermined reference levels, the central control apparatuses further having memories in which the first frequencies and items of information about the first telecommunication connection set up in the first time frames are stored; the transceiver, the air interfaces and the central control apparatuses particularly arranged such that the first telecommunication connections are set up with priority on the first frequencies of the telecommunication signals in the first time frame; and the transceiver, the air interfaces and the central control apparatuses particularly arranged such that second telecommunication connections between the first telecommunication apparatuses and the second telecommunication apparatuses are set up with priority on the stored first frequencies, taking into account the items of information in the first time frames.

In an embodiment, the hybrid multiple access method containing the FDMA principle is the TDMA/FDMA method, the time frames are divided into time segments by means of the FDMA principle, the first telecommunication connections are set up with priority on the first frequencies of the telecommunication signals in first time segments of the first time frames, and the second telecommunication connections are set up with priority on the stored first frequencies and in second time segments of the first time frames.

In an embodiment, the transceiver, the air interfaces and the central control apparatuses are particularly arranged such that the first telecommunication connections are set up on the frequencies of the telecommunication signals and in the time segments of the time frames, if no first frequencies of the telecommunication signals are present.

In an embodiment, the telecommunication systems are locally concentrated to form a "hot spot."

In an embodiment, the telecommunication signals contain items of "dummy bearer" information.

In an embodiment, the telecommunication signals contain items of handover control information.

In an embodiment, the telecommunication systems are arranged as DECT/GAP telecommunication systems with DECT/GAP base stations as first telecommunication apparatuses, and as DECT/GAP mobile parts as second telecommunication apparatuses.

In an embodiment, the telecommunication systems are arranged as GSM telecommunication systems with GSM base stations as first telecommunication apparatuses and GSM mobile parts as second telecommunication apparatuses.

Additional features and advantages of the present invention are described in, and will be apparent from, the Detailed Description of the Preferred Embodiments and the Drawings.

DETAILED DESCRIPTION OF THE PREFERRED EMBODIMENTS

On the basis of FIGS. 3 to 6, FIG. 7 shows two time frames ZR1, ZR2 or, respectively, ZR3, ZR4, offset arbitrarily in relation to one another, and time slots ZS1, ZS2 or, respectively, ZS3, ZS4, for the transmission direction "base station→mobile part" of the two DECT/GAP systems TKS1, TKS2 or, respectively, TKS3, TKS4 according to FIG. 3, which operate in the same environment of the cellular DECT/GAP multisystem. The time frames ZR1, ZR2 or, respectively, ZR3, ZR4 and time slots ZS1, ZS2 or, respectively, ZS3, ZS4 of the two systems TKS1, TKS2 or, respectively, TKS3, TKS4 are offset to one another in such a way that a time slot ZS1 or, respectively, ZS3 occupied by the system TKS1 or, respectively, TKS3 blocks two positions for potential time slots ZS2 or, respectively, ZS4 of the system TKS2 or, respectively, TKS4.

Figure 7:
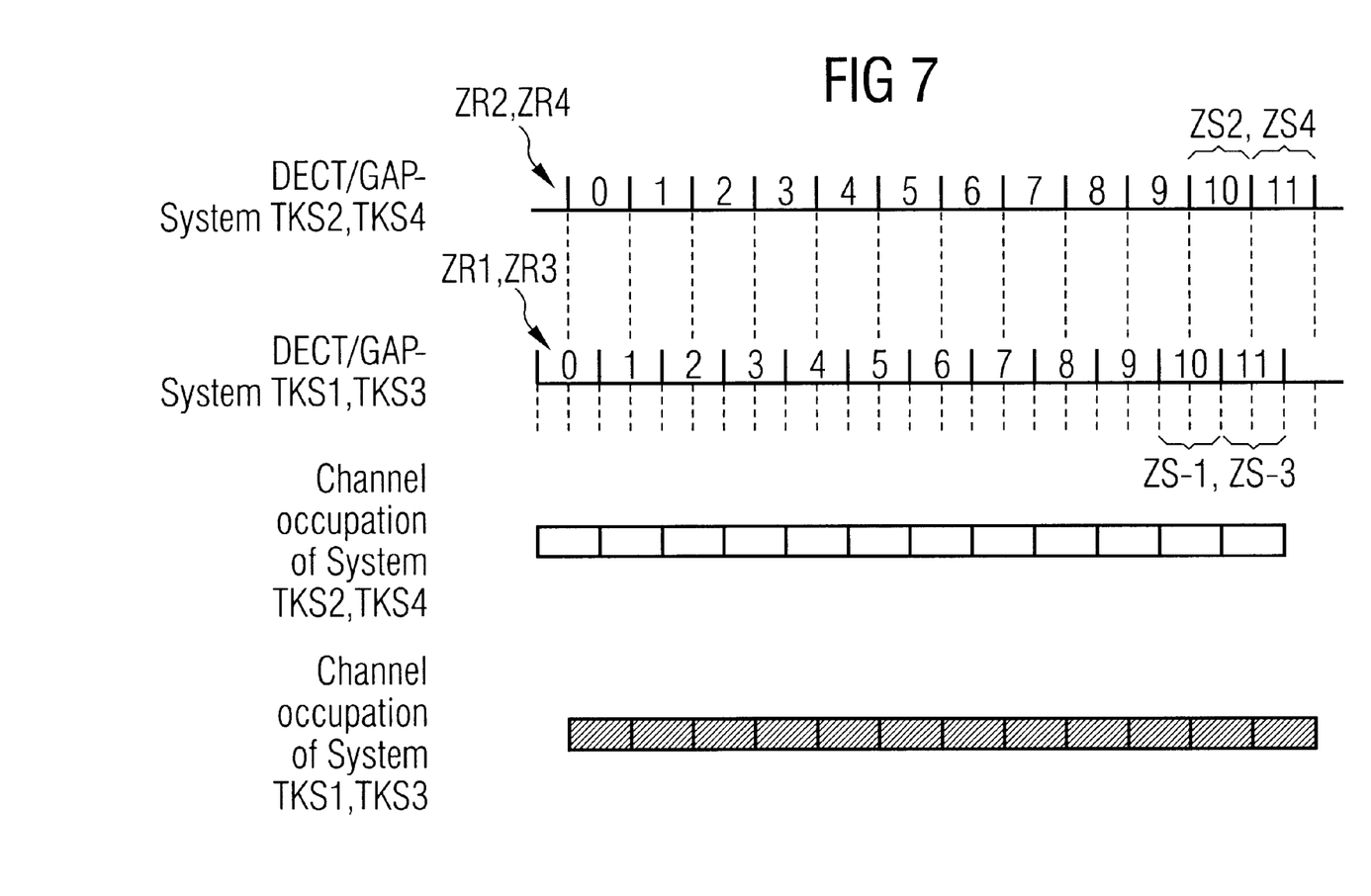
FIG. 7 shows the channel occupation of two DECT/GAP systems operating in the same environment of a DECT/GAP multisystem.

In order to prevent this, in the base stations BS1, BS2 or, respectively, BS3, BS4 of the DECT/GAP systems TKS1, TKS2 or, respectively, TKS3, TKS4, the following functional steps are executed in the context of the base station-specific functional sequence.

First, before the setup of the first telecommunication connection in the respective DECT/GAP system TKS1, TKS2 or, respectively, TKS3, TKS4, the level of the DECT/GAP signals is measured on frequencies of DECT/GAP telecommunication signals predetermined by the FDMA principle for a time duration of at least one DECT/GAP time frame ZR1, ZR2 or, respectively, ZR3, ZR4, which in the concrete case (according to FIG. 4) corresponds to 10 ms. This measurement is carried out in each DECT/GAP system until an FDMA frequency has been found on which no time slot of the time slots ZS1, ZS2 or, respectively, ZS3, ZS4 is occupied. The first telecommunication connection is then set up, with priority, on an arbitrary time slot of this FDMA frequency.

If no "free" time slot is determined, the DECT/GAP systems behave as shown in FIGS. 2 to 6; i.e., in some circumstances mutual channel blockages again occur due to the DECT/GAP systems operating in the same environment.

Subsequently, the number of the FDMA frequency belonging to the first telecommunication connection and the number of the time slot belonging to the first telecommunication connection are stored. Subsequently, all further telecommunication connections of the respective DECT/GAP system TKS1, TKS2 or, respectively, TKS3, TKS4 are respectively set up, with priority, by the relevant base station BS1, BS2, or, respectively, BS3, BS4, in further time slots on the same FDMA frequency.

According to the same method, the "dummy bearer" defined in the DECT standard (cf. ETS 300 175-3, ch. 5.5 and 5.7, October 1992) are positioned and the handover connections are set up.

With this method, the, recurring problem, is reduced that the time grid of the individual DECT/GAP systems constantly alter their position relative to one another due to the lack of synchronization. This drift of the individual time bases has the result that time slots that were "free' in the connection setup can drift into one another after a certain time, which leads to the destruction of data and thus to disturbances in the transmission.

Figure 8:
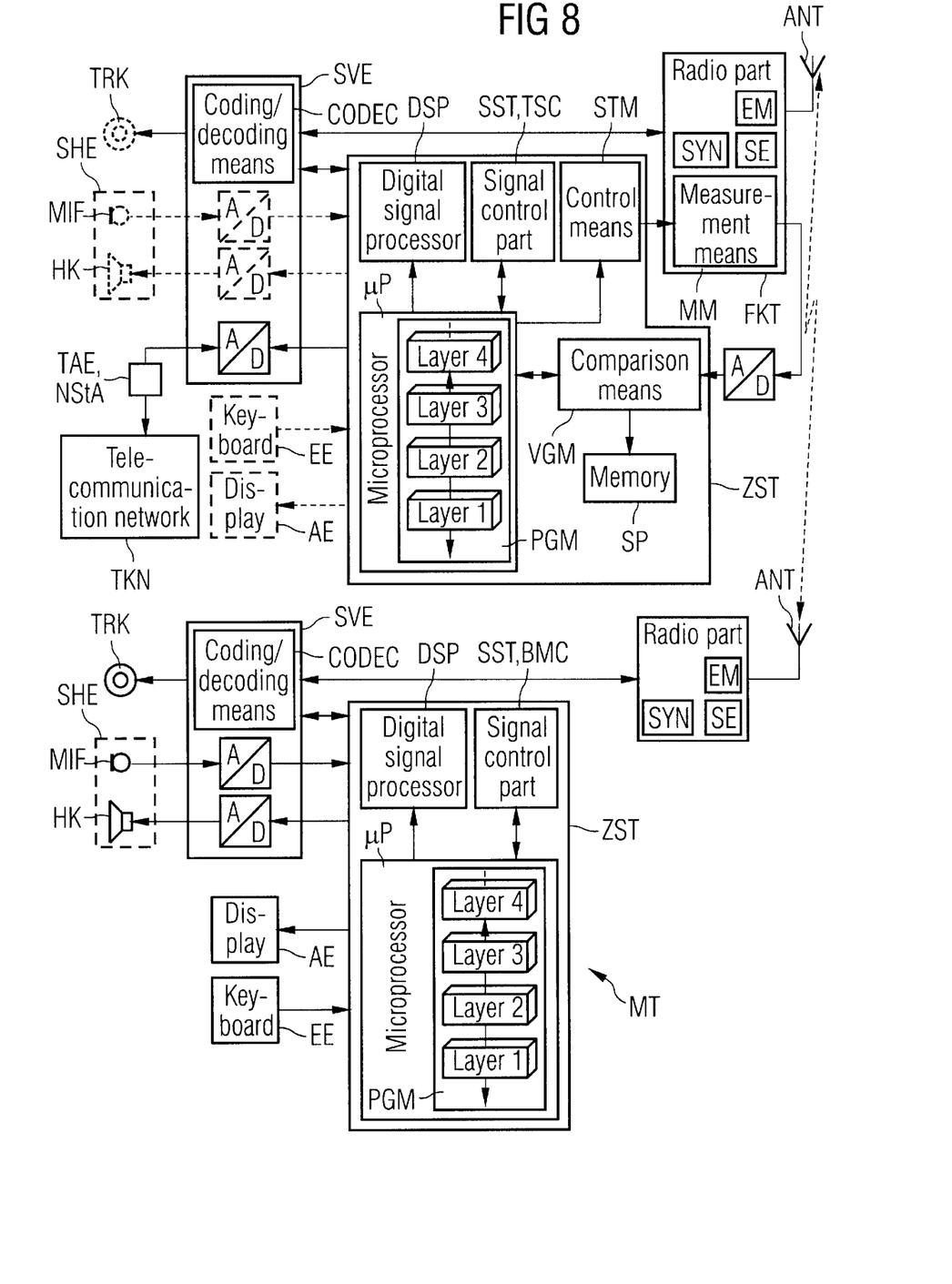
FIG. 8 shows the circuit design of DECT/GAP base station and DECT/GAP mobile part of the DECT/GAP systems according to FIG. 7.

If all DECT/GAP systems follow this algorithm/this method, then according to FIG. 7 (light and dark rectangles) only one FDMA frequency is respectively occupied by a DECT/GAP system, and thus at the same time a synchronization of the time slots on this frequency is produced. FIG. 8 shows, on the basis of FIG. 2 and taking into account FIG. 3, the circuit design of the base stations BS1, BS2 or, respectively, BS3, BS4 modified for the execution of the function steps described above. The radio part FKT additionally includes measurement means MM for the measurement of the level of the DECT/GAP carrier signals received via the DECT/GAP air interface ANT, PGM. These measurement means MM are connected with comparison means VGM in the central control unit ZST via an analog/digital converter. The comparison means VGM have a connection to a memory SP and to the microprocessor $\mu P$. The microprocessor up has in turn a connection to the measurement means MM in the radio part FKT, via control means STM of the central control unit ZST.

Although the present invention has been described with reference to specific embodiments, those of skill in the art will recognize that changes may be made thereto without departing from the spirit and scope of the invention as set forth in the hereafter appended claims.

What is claimed is:

1. A method for improving the degree of utilization of telecommunication channels in locally concentrated, asynchronous, wireless telecommunication systems, in particular DECT/GAP telecommunication systems, the method comprising the steps of:
   determining a predetermined reference level of telecommunication signals;
   determining levels of telecommunication signals on frequencies of the telecommunication signals predetermined by the FDMA principle and for predetermined time frames until first levels on first frequencies of the telecommunication signals for first time frames until the predetermined reference level is reached;
   setting up the first telecommunication connections, according to a hybrid multiple access method containing the FDMA principle, with priority on the first frequencies of the telecommunication signals in the first time frames;
   storing in first telecommunication apparatuses the first frequencies and items of information concerning the first telecommunication connection set up in the first time frames; and
   setting up, with priority, on the stored first frequencies second telecommunication connections, according to the hybrid multiple access method containing the FDMA principles, between the first telecommunication apparatuses and second telecommunication apparatuses following the first telecommunication connections, taking into account the items of information in the first time frames.

2. A method for improving the degree of utilization of telecommunication channels as claimed in claim 1, further comprising the steps of:
   using the TDMA/FDMA method as the hybrid multiple access method containing the FDMA principle;
   dividing the time frames into time segments by the TDMA principle;
   setting up the first telecommunication connections, with priority, on the first frequencies of the telecommunication signals in first time segments of the first time frames; and
   setting up the second telecommunication connections, with priority, on the stored first frequencies and in second time slots of the first time frames.

3. A method for improving the degree of utilization of telecommunication channels as claimed in claim 1, wherein the first telecommunication connections are set up on the frequencies of the telecommunication signals and in the time frames if no first frequencies of the telecommunication signals are determined.

4. A method for improving the degree of utilization of telecommunication channels as claimed in claim 1, wherein the telecommunication systems are locally concentrated to form a "hot spot."

5. A method for improving the degree of utilization of telecommunication channels as claimed in claim 1, wherein the telecommunication signals contain items of "dummy bearer" information.

6. A method for improving the degree of utilization of telecommunication channels as claimed in claim 1, wherein the telecommunication signals contain items of "handover" control information.

7. A method for improving the degree, of utilization of telecommunication channels as claimed in claim 1, wherein the telecommunication systems are DECT/GAP telecommunication systems with DECT/GAP base stations as first telecommunication apparatuses and DECT/GAP mobile parts as second telecommunication apparatuses.

8. A method for improving the degree of utilization of telecommunication channels as claimed in claim 1, wherein the telecommunication systems are GSM telecommunication systems with GSM base stations as first telecommunication apparatuses and GSM mobile parts as second telecommunication apparatuses.

9. A system for improving the degree of utilization of telecommunication channels in locally concentrated asynchronous wireless telecommunication systems, in particular DECT/GAP telecommunication systems, wherein:
   the telecommunication systems comprise first telecommunication apparatuses that can be connected with second telecommunication apparatuses of the telecommunication system using wireless telecommunication according to a hybrid multiple access method containing the FDMA principle;
   the first telecommunication apparatuses comprise a transceiver for telecommunication signals, air interfaces and central control apparatuses that are arranged and connected with one another wherein, via the wireless transmission of the telecommunication signals according to the hybrid multiple access method containing the FDMA principle, wireless telecommunication connections are set up to the second telecommunication apparatuses;
   the transceiver comprises measurement means for measuring levels of the telecommunication signals on frequencies of the telecommunication signals, prior to setting up the first telecommunication connections, wherein the frequencies are determined by means of the FDMA principle and for predetermined time frames;
   the central control apparatuses comprise comparison means for comparing the measured level with a predetermined reference level, and further comprise control means via which, depending on the comparison results, the measurement means for measuring the levels are controlled until first levels on first frequencies of the telecommunication signals and determined for first time frames do not exceed the predetermined reference levels, the central control apparatuses further comprising memories in which the first frequencies and items of information about the first telecommunication connection set up in the first time frames are stored;
   the transceiver, the air interfaces and the central control apparatuses are particularly arranged that the first telecommunication connections are set up with priority on the first frequencies of the telecommunication signals in the first time frames; and
   the transceiver, the air interfaces and the central control apparatuses are particularly arranged that the second telecommunication connections between the first telecommunication apparatuses and the second telecommunication apparatuses are set up with priority on the stored first frequencies, taking into account the items of information in the first time frames.

10. A system for improving the degree of utilization of telecommunication channels as claimed in claim 9, wherein:

the hybrid multiple access method containing the FDMA principle is the TDMA/FDMA method;

the time frames are divided into time segments by means of the TDMA principle;

the first telecommunication connections are set up with priority on the first frequencies of the telecommunication signals in first time segments of the first time frames;

the second telecommunication connections are set up with priority on the stored first frequencies and in second time segments of the first time frames.

11. A system for improving the degree of utilization of telecommunication channels as claimed in claim 9, wherein the transceiver, the air interfaces and the central control apparatuses are particularly arranged such that the first telecommunication connections are set up on the frequencies of the telecommunication signals and in the time segments of the time frames, if no first frequencies of the telecommunication signals are present.

12. A system for improving the degree of utilization of telecommunication channels are claimed in claim 9, wherein the telecommunication systems are locally concentrated to form a "hot spot."

13. A system for improving the degree of utilization of telecommunication channels as claimed in claim 9, wherein the telecommunication signals contain items of "dummy bearer" information.

14. A system for improving the degree of utilization of telecommunication channels as claimed in claim 9, wherein the telecommunication signals contain items of handover control information.

15. A system for improving the degree of utilization of telecommunication channels as claimed in claim 9, wherein the telecommunication systems are arranged as DECT/GAP telecommunication systems with DECT/GAP base stations as first telecommunication apparatuses, and as DECT/GAP mobile parts as second telecommunication apparatuses.

16. A system for improving the degree of utilization of telecommunication channels as claimed in claim 9, wherein the telecommunication systems are arranged as GSM telecommunication systems with GSM base stations as first telecommunication apparatuses and GSM mobile parts as second telecommunication apparatuses.

\* \* \* \* \*